(12) United States Patent
Rhee et al.

(10) Patent No.: US 9,106,735 B2
(45) Date of Patent: Aug. 11, 2015

(54) DETECTION OF WIRING DEFECTS

(75) Inventors: Wonjong Rhee, San Francisco, CA (US); Ardavan Maleki Tehrani, Menlo Park, CA (US); Mehdi Mohseni, Menlo Park, CA (US); George Ginis, San Mateo, CA (US); Haibo Zhang, Fremont, CA (US); Sun-Uk Park, Los Altos, CA (US)

(73) Assignees: Adaptive Spectrum and Signal Alignment, Inc., Redwood City, CA (US); AT&T Intellectaul Property I, L.P., Reno, NV (US)

( * ) Notice: Subject to any disclaimer, the term of this patent is extended or adjusted under 35 U.S.C. 154(b) by 210 days.

(21) Appl. No.: 13/512,262

(22) PCT Filed: Nov. 25, 2009

(86) PCT No.: PCT/US2009/065943
§ 371 (c)(1),
(2), (4) Date: Sep. 20, 2012

(87) PCT Pub. No.: WO2011/065945
PCT Pub. Date: Jun. 3, 2011

(65) Prior Publication Data
US 2013/0022178 A1    Jan. 24, 2013

(51) Int. Cl.
*H04M 3/30* (2006.01)
*H04L 12/28* (2006.01)
*H04L 12/24* (2006.01)
*H04L 12/26* (2006.01)
*H04B 3/46* (2015.01)
*H04B 3/32* (2006.01)

(52) U.S. Cl.
CPC ............. *H04M 3/304* (2013.01); *H04B 3/46* (2013.01); *H04L 12/2869* (2013.01); *H04L 41/5035* (2013.01); *H04L 43/0847* (2013.01); *H04B 3/32* (2013.01); *H04M 3/30* (2013.01)

(58) Field of Classification Search
CPC ........ H04B 3/32; H04B 3/46; H04L 41/5035; H04L 12/2869; H04L 43/0847; H04M 3/26; H04M 3/30; H04M 3/304
See application file for complete search history.

(56) References Cited

U.S. PATENT DOCUMENTS

2005/0123027 A1 * 6/2005 Cioffi et al. ............... 375/222
2006/0095565 A1   5/2006 Rhee et al.

FOREIGN PATENT DOCUMENTS

| JP | 2007513556 | 5/2007 |
| JP | 2008536350 | 9/2008 |
| JP | 2008546297 | 12/2008 |
| JP | 2009500985 | 1/2009 |

(Continued)

OTHER PUBLICATIONS

G.997.1, Apr. 2009, ITU-T.*

(Continued)

*Primary Examiner* — Jae Y Lee
(74) *Attorney, Agent, or Firm* — Blakely Sokoloff Taylor & Zafman LP

(57) ABSTRACT

A method for detecting a defect in wiring in a DSL system. The method includes collecting data including instantaneous values, a history of values, and/or parameters relating to a central office or customer premises equipment, analyzing a line for a wiring defect based on the collected data, and reporting whether or not a wiring defect was detected responsive to the analyzing step.

10 Claims, 11 Drawing Sheets

(56) References Cited

FOREIGN PATENT DOCUMENTS

| WO | WO 2008/016585 | * | 2/2008 |
|---|---|---|---|
| WO | WO-2008/073327 | | 6/2008 |
| WO | WO-2011002459 | | 1/2011 |

OTHER PUBLICATIONS

ISR & Written Opinion for International Application No. PCT/US2009/065943, Mailed Jan. 21, 2010, 8 Pages.

International Preliminary Report on Patentability for International Patent Application No. PCT/US2009/065943, Mailed Jun. 7, 2012, 6 Pages.

Non-final Office Action for Japanese Patent Application No. 2012-541059, Mailed Nov. 12, 2013, 5 pages.

Non-Final Office Action for Chinese Patent Application No. 200980163136.1, Mailed Jan. 30, 2014, 14 pages.

Non-Final Office Action for Japanese Patent Application No. 2012-541059, mailed Nov. 18, 2014.

Non-Final Office Action for Chinese Patent Application No. 200980163136.1, mailed Dec. 15, 2014.

* cited by examiner

DETECTION OF WIRING DEFECTS

CLAIM OF PRIORITY

This application is a U.S. National Phase application under §371 of International Application No. PCT/US2009/069543, filed Nov. 25, 2009, entitled METHOD AND APPARATUS FOR DETECTION OF WRING DEFECTS IN A DIGITAL, SUBSCRIBER. The entire contents of which are incorporated herein by reference.

BACKGROUND OF THE INVENTION

1. Field of the Disclosure

This disclosure relates to the field of DSL (Digital Subscriber Line) communications, and in particular, a method and apparatus to detect, analyze, and report DSL wiring defect conditions.

2. Description of Related Art

Digital subscriber line (DSL) technologies provide potentially large bandwidth for digital communication over existing telephone subscriber lines (referred to as loops and/or the copper plant). Telephone subscriber lines can provide this bandwidth despite their original design for only voice-band analog communication. In particular, asymmetric DSL (ADSL) and very-high-speed DSL (VDSL) can adjust to the characteristics of the subscriber line by using a discrete multi-tone (DMT) line code that assigns a number of bits to each tone (or sub-carrier), which can be adjusted to channel conditions as determined during training and initialization of the modems (typically transceivers that function as both transmitters and receivers) at each end of the subscriber line. DSL systems can use vectoring technologies, where joint transmitter and/or joint receiver signal processing can be performed among multiple pairs to mitigate the effects of crosstalk interference, and thus to improve performance.

The performance of DSL systems can be affected when there are undesired noise sources or when the loops are impaired. DSL systems would further benefit from determining the specific cause of a problem such as a DSL link instability and/or poor link quality that can lead to a DSL link failure, link error or loss of bandwidth and taking measures to report such problem and its corresponding cause, in order to get the problem fixed.

In particular, when there is a wiring problem or loop impairment near customer premise equipment, the downstream bit distribution can be distorted due to a variety of causes. One of such causes can be an incomplete common-mode rejection combined with noise harmonics from nearby electronics or other noise sources. This can happen if one of the two copper wires is impaired or when the impedance of the two wires is not matched well, hence resulting in an unbalanced line. An unbalance issue in the two wires makes them susceptible to common-mode noise. The source of the noise could be radiation from common radio sources in the DSL environment or inside DSL user homes. For example some lines are affected by noise sources with 40~80 Khz harmonics, which are often generated by TV and computer monitors, such as HDTV sources. This noise can be measured for instance by using a spectrum analyzer by placing a probe near a noise source such as a laptop's screen, which could exhibit near 60 Khz harmonics.

Another possible cause is the short bounces of the DSL signal in the presence of wiring problems. Multi-port modeling with twisted pairs shows that cross-pair modes may vary by as much as 40 dB from "tone to tone" in extreme cases. The effect is magnified by larger imperfection in the twisting of the two wires (imperfection in twisting has similar effects as imperfection in balance). Indeed, for bad balance, such as the one occurring in the presence of the 3rd "wire" used in old telephones as the circuit for the bell, the third wire can be considered as an earth ground and the bad balance implies similar impact as irregular twisting. Basic multi-port transmission line theory models a transmission line by a series of incremental uniform segments. The discontinuities caused by the imperfections create multiple reflection points along the line leading to short bounces back-and-forth of the electromagnetic waves, which can cause the rapid notching in bit-distribution. In this case, the channel parameters such as Hlog or Hlin might show the notching.

In addition, DSL system loading and bit-swapping algorithms can be another source of the problem. When there is a wiring problem near customer premise equipment and the noise from electronics or other sources affect the line's bit loading, the noise spectrum received by the equipment can vary quickly in time because of the nature of noise sources. When the noise spectrum is varying quickly in time, a bit loading algorithm in the customer premises equipment might not be able to respond properly, hence resulting in an abnormal bit distribution. This especially can be the case, when the bit loading pattern does not match any frequency harmonics.

There are many known types of wiring problems in DSL systems. For example in some countries the in-house DSL wiring often includes a redundant third wire that was used for ringing a telephone bell several decades ago. The third-wire is not used any more, but the existence of such third wire in DSL systems creates an unbalanced impedance. The presence of a third wire results in a line imbalance, which in turn makes the system susceptible to external noise, signal bouncing, undesired bit loading, etc. as discussed above.

Moreover, other impairments (echo, external noise and serial-resistance/shunt/half-cut to name a few) could also cause instability in the line. In addition, the instability could appear in other line parameters such as the Hlog, noise or signal to noise (SNR) measurements. For example a serial-resistance/shunt/half-cut creates similar behavior in Hlog as well as bit loadings.

The DSL system operator and the customer would greatly benefit from detection of such wiring defect problems and their cause by evaluating the relevant data from the DSL system.

Existing line testing techniques often fail to identify the source of such impairments, and also require special devices and testing equipment. Many line testing techniques, involve using line probes, test signals, test equipment and devices, which measure physical characteristics of the line, or transmit signals on the lines, and measure reflections to find out information about the state of the line being tested. Most of these techniques require dispatching a technician to the customer site, which not only entails a large expense for the service providers, the testing procedure is also disruptive to the operation of the line. In these techniques, in order to perform the line testing, the normal operation of the line needs to be disrupted, while the testing and signal measurements are performed. In some cases, the service providers even seek the assistance of the customers. In such cases the customers are asked to manipulate in-house equipment, based on which the service provider will perform testing measurement to identify the wiring problem.

Embodiments of the current invention avoid all the above issues, by not requiring any testing devices, test signals, or disruptive measurements. The embodiments use the existing information collected from the line, without causing any disruption to the service.

The DSL system operator and the customer would greatly benefit from means for determining such wiring defect problems and their cause by evaluating the relevant data from the DSL system.

BRIEF DESCRIPTION OF THE DRAWINGS

Embodiments of the invention are illustrated by way of example and not by way of limitation in the figures of the accompanying drawings in which like references indicate similar elements. It should be noted that references to "an" or "one" embodiment in this disclosure are not necessarily to the same embodiment, and such references mean "at least one."

DETAILED DESCRIPTION

Figure 1:
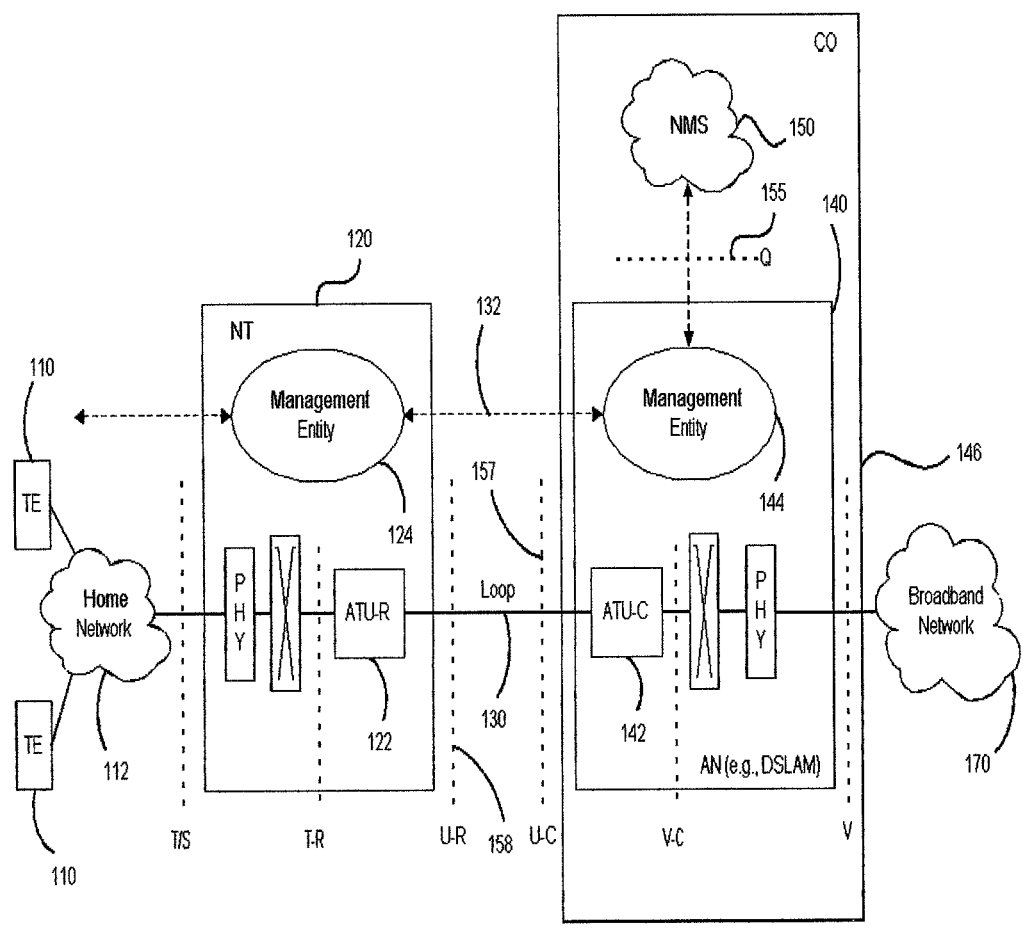
FIG. 1 shows a prior art reference model diagram for a DSL system from the ITU-T G.997.1 standard.

FIG. 1 shows the reference model system according to the G.997.1 standard (G.ploam). This model applies to all ADSL systems meeting the various standards that may or may not include splitters, such as ADSL1 (G.992.1), ADSL-Lite (G.992.2), ADSL2 (G.992.3), ADSL2-Lite G.992.4, ADSL2+(G.992.5) and the G.993.1 and G.9932 VDSL standards, as well as the G.991.1 and G.991.2 SHDSL standards, all with and without bonding.

The G.997.1 standard specifies the physical layer management for ADSL transmission systems based on the clear embedded operation channel (EOC) defined in G.997.1 and use of indicator bits and EOC messages defined in G.992.x and G.993.x standards. Moreover, G.997.1 specifies network management elements content for configuration, fault and performance management. In performing these functions, the system utilizes a variety of operational data that is available at an access node (AN).

In FIG. 1, users' terminal equipment 110 is coupled to a home network 112, which in turn is coupled to a network termination unit (NT) 120. NT 120 includes an ATU-R 122 (for example, a transceiver defined by one of the ADSL standards) or any other suitable network termination modem, transceiver or other communication unit. NT 120 also includes a management entity (ME) 124. ME 124 can be any suitable hardware device, such as a microprocessor, microcontroller, or circuit state machine in firmware or hardware, capable of performing according to any applicable standards and/or other criteria. ME 124 collects and stores performance data in its Management Information Base (MIB), which is a database of information maintained by each ME. The MIB can be accessed via network management protocols such as SNMP (Simple Network Management Protocol), an administration protocol used to gather information from a network device to provide to an administrator console/program, or via TL1 commands, TL1 being a well known command language used to program responses and commands between telecommunication network elements.

Each xTU-R in a system is coupled to an xTU-C in a Central Office (CO) or other central location. In FIG. 1, ATU-C 142 is located at an access node (AN) 140 in a CO 146. An ME 144 likewise maintains an MIB of performance data pertaining to xTU-C 142. The AN 140 may be coupled to a broadband network 170 or other network, as will be appreciated by those skilled in the art. xTU-R 122 and xTU-C 142 are coupled together by a loop 130, which in the case of ADSL and VDSL typically is a telephone twisted pair that also carries other communication services.

Several of the interfaces shown in FIG. 1 are used for determining and collecting performance data. The Q-interface 155 provides the interface between the Network Management Station (NMS) 150 of the operator and ME 144 in AN 140. All of the parameters specified in the G.997.1 standard apply at the Q-interface 155. The near-end parameters supported in ME 144 are derived from xTU-C 142, while the far-end parameters from xTU-R 122 can be derived by either of two interfaces over the U-interface. Indicator bits and Embedded Operations Channel (EOC) messages, which are sent using embedded channel 132 and are provided at the Physical Media Dependent (PMD) layer, can be used to generate the xTU-R 122 parameters in ME 144. Alternately, the Operation Administration and Management (OAM) channel and a suitable protocol can be used to retrieve the parameters from xTU-R 122 when requested by ME 144. Similarly, the far-end parameters from xTU-C 142 can be derived by either of two interfaces over the U-interface. Indicator bits and EOC messages, which are provided at the PMD layer, can be used to generate the xTU-C 142 parameters in ME 122 of NT 120. Alternately, the OAM channel and a suitable protocol can be used to retrieve the parameters from xTU-C 142 when requested by ME 124.

At the U-interface (which is essentially loop 130), there are two management interfaces, one at xTU-C 142 (the U-C interface 157) and one at xTU-R 122 (the U-R interface 158). Interface 157 provides xTU-C near-end parameters for xTU-R 122 to retrieve over the U-interface 130. Similarly, interface 158 provides xTU-R near-end parameters for xTU-C 142 to retrieve over the U-interface 130. The parameters that apply may be dependent upon the transceiver standard being used (for example, G.992.1 or G.992.2).

The G.997.1 standard specifies an optional OAM communication channel across the U-interface. If this channel is implemented, xTU-C and xTU-R pairs may use it for transporting physical layer OAM messages. Thus, the transceivers 122, 142 of such a system share various operational and performance data maintained in their respective MIBs.

In a typical topology of a DSL plant, in which a number of transceiver pairs are operating and/or available, part of each subscriber loop is co-located with the loops of other users within a multi-pair binder (or bundle). After the pedestal, very close to the Customer Premises Equipment (CPE), the loop takes the form of a drop wire and exits the bundle. Therefore, the subscriber loop traverses two different environments. Part of the loop may be located inside a binder, where the loop is sometimes shielded from external electromagnetic interference, but is subject to crosstalk dues to its proximity to other loops in the binder. After the pedestal, the drop wire is often unaffected by crosstalk due to its being farther away from other pairs for most of the drop, but transmission can also be more significantly impaired by electromagnetic interference because the drop wires are unshielded. Many drop wires have 2 to 8 twisted-pairs within them and in situations of multiple services to a home or bonding (multiplexing and demultiplexing of a single service) of those lines, additional substantial crosstalk can occur between these lines in the drop segment.

Figure 2:
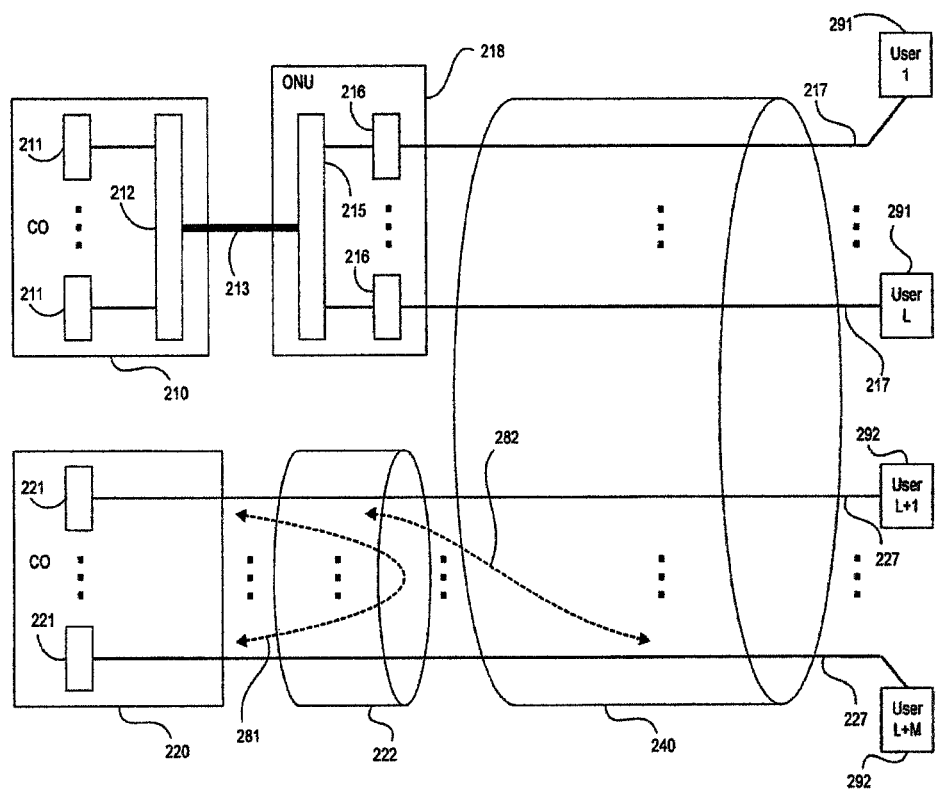
FIG. 2 is a schematic diagram of a generic, exemplary DSL deployment known in the prior art.

A generic, exemplary DSL deployment scenario is shown in FIG. 2. All the subscriber loops of a total of (L+M) users 291, 292 pass through at least one common binder. Each user is connected to a Central Office (CO) 210, 220 through a dedicated line. However, each subscriber loop may be passing through different environments and mediums. In FIG. 2, L customers or users 291 are connected to CO 210 using a combination of optical fiber 213 and twisted copper pairs 217, which is commonly referred to as Fiber to the Cabinet (FTT-Cab) or Fiber to the Curb. Signals from transceivers 211 in CO 210 have their signals converted by optical line terminal 212 and optical network terminal 215 in CO 210 and optical network unit (ONU) 218. Modems 216 in ONU 218 act as transceivers for signals between the ONU 218 and users 291.

Users' lines that co-terminate in locations such as COs 210, 220 and ONU 218 (as well as others) may be operated in a coordinated fashion, such as vectoring. In vectored communication systems (such as vectored ADSL and/or VDSL systems), coordination of signals and processing can be achieved. Downstream vectoring occurs when multiple lines' transmit signals from a DSLAM or LT are co-generated with a common clock and processor. In VDSL systems with such a common clock, the crosstalk between users occurs separately for each tone. Thus each of the downstream tones for many users can be independently generated by a common vector transmitter. Similarly, upstream vectoring occurs when a common clock and processor are used to co-receive multiple lines' signals. In VDSL systems with such a common clock, the crosstalk between users occurs separately for each tone. Thus each of the upstream tones for many users can be independently processed by a common vector receiver.

The loops 227 of the remaining M users 292 are copper twisted pairs only, a scenario referred to as Fiber to the Exchange (FTTEx). Whenever possible and economically feasible, FTTCab is preferable to FTTEx, since this reduces the length of the copper part of the subscriber loop, and consequently increases the achievable data transmission rates. The existence of FTTCab loops can create problems to FTTEx loops. Moreover, FTTCab is expected to become an increasingly popular topology in the future. This type of topology can lead to substantial crosstalk interference and may mean that the lines of the various users have different data carrying and performance capabilities due to the specific environment in which they operate. The topology can be such that fiber-fed "cabinet" lines and exchange lines can be mixed in the same binder.

As can be seen in FIG. 2, the lines from CO 220 to users 292 share binder 222, which is not used by the lines between CO 210 and users 291. Moreover, another binder 240 is common to all the lines to/from CO 210 and CO 220 and their respective users 291, 292. In FIG. 2, far end crosstalk (FEXT) 282 and near end crosstalk (NEXT) 281 are illustrated as affecting at least two of the lines 227 collocated at CO 220.

Figure 3:
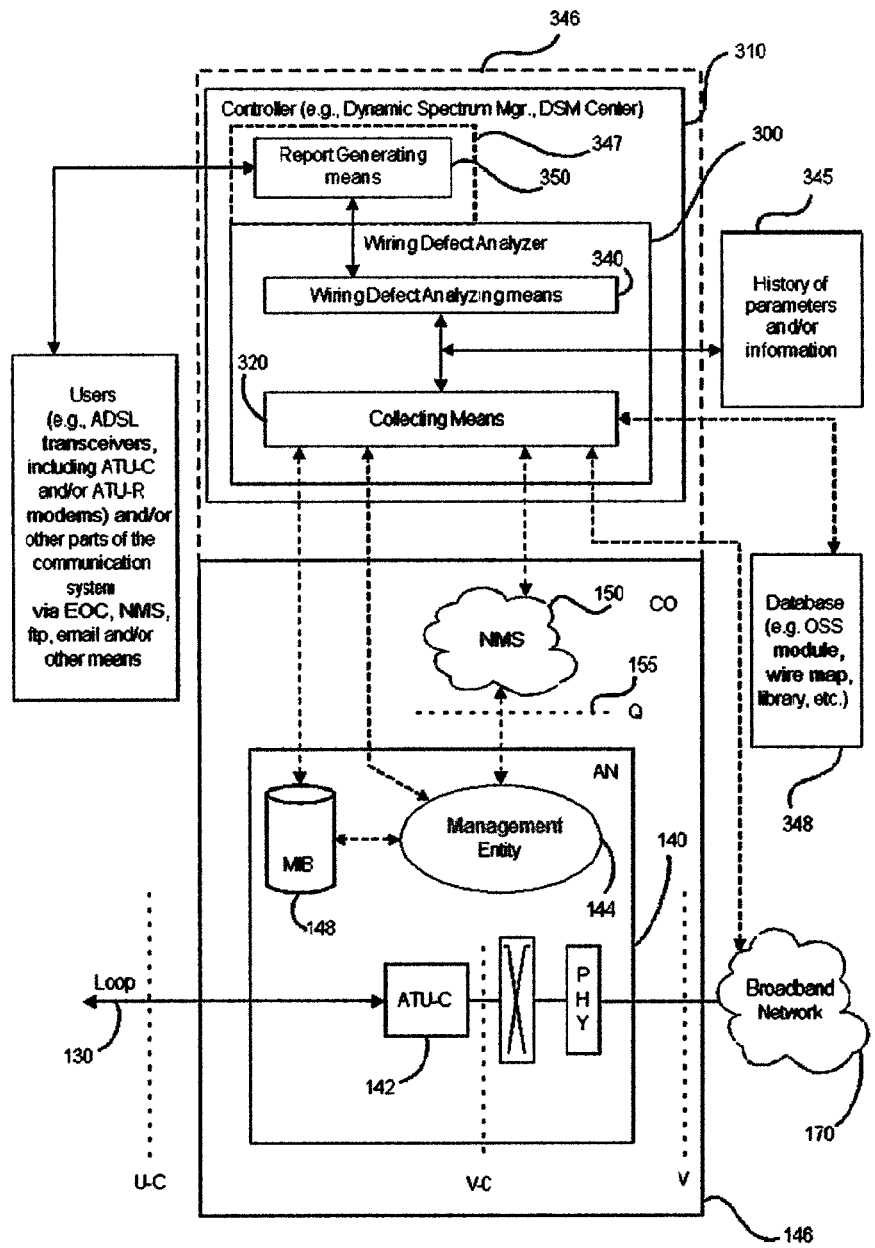
FIG. 3 illustrates a particular embodiment of a DSL system.

According to one embodiment shown in FIG. 3, a "Wiring Defect Analyzer" 300 may be part of an independent entity monitoring one or more DSL systems as a controller 310 (for example, a DSL optimizer, a dynamic spectrum manager or dynamic spectrum management center) assisting users and/or one or more system operators or providers in optimizing or otherwise controlling their use of the system. (A dynamic spectrum manager may also be referred to as a Dynamic Spectrum Management Center, DSM Center, DSL Optimizer, Spectrum Maintenance Center or SMC.) In some embodiments, the controller 310 may be operated by an Incumbent Local Exchange Carrier (ILEC) or Competitive Local Exchange Carrier (CLEC) operating DSL lines from a CO or other location. In other embodiments, a "smart" modem unit can have a controller (having, for example, a processor and memory) integrated with the modem in a user location, a central office or some other single location.

As seen from the dashed line 346 in FIG. 3, controller 310 may be in or part of the CO 146 or may be external and independent of CO 146 and any party operating within the system. Moreover, controller 310 may be connected to and/or controlling multiple COs. Likewise, components of controller 310 may or may not be in the same location and/or equipment, and/or may instead be accessed by the controller at different locations.

In the exemplary system of FIG. 3, the "Wiring Defect Analyzer" 300 includes collecting means 320 (which also may perform monitoring, if desired) and "Wiring Defect Analyzing" means 340. As seen in FIG. 3, the collecting and/or monitoring means 320 may be coupled to and may collect data through and from sources internal to a DSL system, such as NMS 150, ME 144 at AN 140 and/or the MIB 148 maintained by ME 144. Data also may be collected from external sources by means 320 through the broadband network 170 (for example, via the TCP/IP protocol or other means outside the normal internal data communication systems within a given DSL system). Also, the collecting means 320 may have access to one or more databases or other sources 348, storing binder-level information, such as deployment information, topology information, crosstalk coupling, etc, or information about modem capabilities, such as procedures for bit loading and power allocation, and service priorities. The controller may collect operational data from an xTU-R over the Internet or even from an xTU-C over the Internet if the Element and Network Management Station (EMS) bandwidth is limited or if the EMS is uncooperative (for example, by blocking reported management data because the equipment manufacturer wishes to perform the management internally to its equipment). Operational data also can be collected from the NMS of the service provider, which may be collecting from various sources itself.

"Wiring Defect Analyzing" module 340 and/or monitoring/collecting module 320 may also be coupled to a source 345 of parameter history and/or other such related information, such as a database or memory that may or may not be part of the "Wiring Defect Analyzer" 300 or controller 310. One or more of the "Wiring Defect Analyzer's" connections allows the "Wiring Defect Analyzer" 300 to collect operational data. Data may be collected once (for example, during a single transceiver training) or over time. In some cases, the monitoring means 320 will collect data on a periodic basis, though it also can collect data on-demand or any other non-periodic basis, thus allowing the "Wiring Defect Analyzer" 300 to update its user and line data, if desired.

"Wiring Defect Analyzing" means 340 is capable of analyzing data provided to it to determine whether any of the DSL modems is experiencing instability in their lines. The "Wiring Defect Analyzing" means 340 of "Wiring Defect Analyzer" 300 is coupled to a "Report Generating" module 350 in the controller 310. "Report Generator" means 350 is configured to accept a parameter value generated by the "Wiring Defect Analyzing" means 340 for use by the DSL system operator. The "Report Generator" means 350 is configured to inform the DSL System operator of the Wiring Defect problems in the affected modems. As indicated by the dashed line 347, the "Report Generating" means 350 may or may not be part of the "Wiring Defect Analyzer" 300 and/or may be implemented in the same hardware, such as a computer system.

The collecting means 320 also may be coupled to the corresponding modules of a second controller or DSL optimizer. Thus, operational data can be collected from other DSL lines, even when they are not controlled by the same DSL optimizer, Dynamic Spectrum Management (DSM) center or SMC. Conversely, a controller 310 may provide operational data of its own DSL lines to a public or private database (for example, a public or privately controlled web site or connection where DSL management entities can share data appropriately) for appropriate use by regulators, service providers and/or other DSL optimizers. As will be appreciated by those skilled in the art, if the controller is a wholly independent entity (that is, not owned and/or operated by the company owning and/or operating lines within the CO), much of the DSL system's configuration and operational information may be unavailable. Even in cases where a CLEC or ILEC operates and/or functions as the controller 310, much of this data may be unknown.

Figure 8:
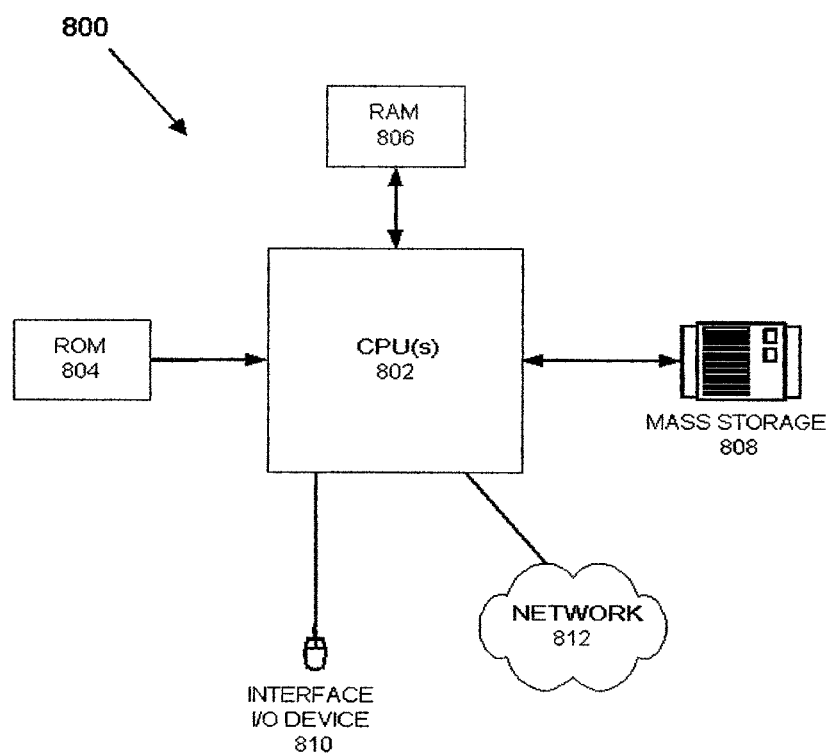
FIG. 8 illustrates a computing platform on which an embodiment of a DSL analysis system may be practiced.

In some embodiments, the analyzer 300 may be implemented in a computer such as a PC, workstation or the like (one example of which is disclosed in connection with FIG. 8). The collecting means 320, "Wiring Defect Analyzing" means 340 and/or "Report Generating" means 350 may be software modules, hardware modules or a combination of both. These components may all reside in the same computer system, for example, or may be in distinct apparatus. For management of large numbers of lines, databases may be introduced and used to manage the volume of data generated by the lines and the controller.

An embodiment can be characterized as a "Wiring Defect Characterization". A discussion of "Wiring Defect Characterization" is provided next.

Wiring Defect Characterization

With reference to FIG. 3, one embodiment is described. At module 320, data is collected. Data collection may be performed multiple times. Data collected may include instantaneous values (value at time of data collection), or a history of values (values obtained at various times before data collection). Data can include parameters related to the Central Office (CO-side, or sometimes referred to as Near-End, NE), or to the Customer Premises (CP-side, or sometimes referred to as Far-End, FE).

In one embodiment the parameters to collect may include:
From G.997.1:
Line Inventory
G.994.1 vendor ID
System vendor ID
Version number
Serial number
Channel Test, Diagnostic and Status Parameters
Actual Data Rate
Line Test, Diagnostic and Status Parameters
LATN, line attenuation
SATN, signal attenuation
SNRM, SNR margin
ACTPSD, actual PSD level
BITS (Bit distribution)
SNR ATTNDR, Attainable Net Data Rate which is the same as MABR
QLN, Quiet Line Noise
MREFPSD, Referenced PSD
Line Performance Monitoring Parameters
CV, code violations
FEC, number of corrected codewords
FECS, FEC seconds
ES, errored seconds
SES, severely errored seconds
LOSS, loss-of-signal seconds
UAS, unavailable seconds
Full initializations (or REINIT)
Failed initializations
Retrains
Retrain count
Resynchronization
Resynchronization count
Line Failures
LOS, loss of signal failure
LOF, loss of frame failure
LPR, loss of power failure
UNIT, line initialization failure
From WT-135 Revision 4:
Object .STBService.{i}.AVStreams.-AVStream.{i}.IP.RTP.Stats
PacketsReceived
BytesReceived
PacketsLost
FractionLost
CorruptedPackets
Overruns
Underruns
ReceiveInterarrivalJitter
AverageReceiveInterarrivalJitter
Object .STBService.{i}.AVStreams.-AVStream.{i}.MPEG2TS.Stats
PacketsReceived
PacketDiscontinuityCounter
Overruns
Underruns
Additional Parameters from the Dynamic Spectrum Management Technical Report:
MSE, mean-square-error per tone
Pb, probability of error per tone
Hlog, Hlin,
Xlog, Xlin, crosstalk coupling
MARGIN[i], margin per tone
Additional Parameters:
SOS notifications/events/counters (resulting in abrupt reduction of data rate)
SRA (Seamless Rate Adaptation) notifications/events/counters
Failure causes
Bit-swap counts
Bit distribution statistics (e.g. min-max-median-average per tone)

The data collected by the controller is then processed by the Wiring Defect analyzer. The purpose of the Wiring Defect analysis is to detect unusual line instabilities, in particular to detect rapid variations in the line parameters, such as the bit distribution, Hlog (Hlin), SNR, and measured noise.

Embodiments of the present invention can be applied to DSL line parameters such as bit distribution, Hlog (Hlin), SNR and noise. Typically Hlog (Hlin) and SNR per tone are reported parameters similar to the bit distribution, which can be used in the analysis. For the noise, it may be directly reported by equipment as Quiet-Line-Noise (QLN) or Mean Square Error (MSE) per tone, or it may be calculated indirectly from SNR, HLOG and Power Spectral Density (PSD). This is done through the following calculation:

MSE(n)=PSD(n)+Hlog(n)−SNR(n), where n is the frequency tone index.

Figure 4:
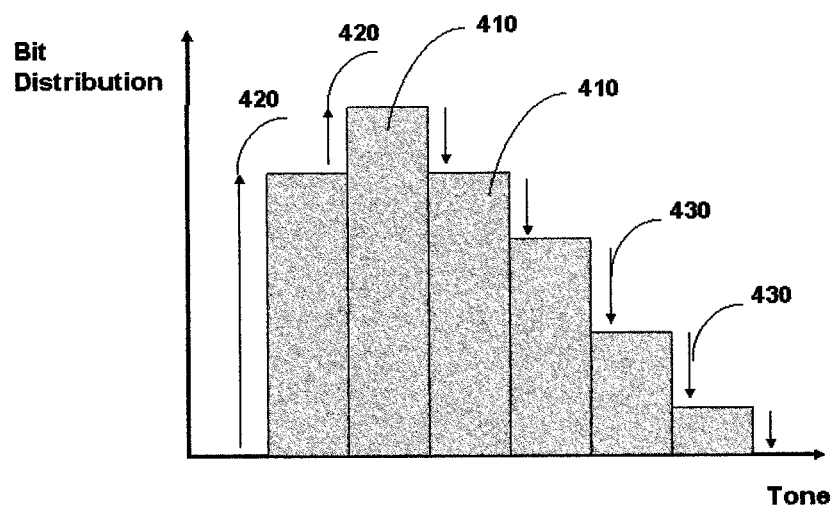
FIG. 4 illustrates a typical bit distribution profile for a downstream channel of a DSL line.

FIG. 4 shows a typical bit distribution profile for a downstream channel. The DSL line bit distributions 410 follow the line frequency response profile. As seen from the figure for a typical line, the bit distribution is high in the lower frequencies, and then gradually drops. The sum of the differences in the number of bits across all tones is zero since the sum of the signed change vectors, positive changes 420, and negative changes 430 (as shown in the figure) cancel each other out. It is also easy to show that the sum of the absolute value of the changes, positive changes 420, and negative changes 430, would be twice the sum of the positive changes when the number of bits is non-decreasing until it reaches the maximum number of bits and then non-increasing for the rest of the tones.

Figure 5A:
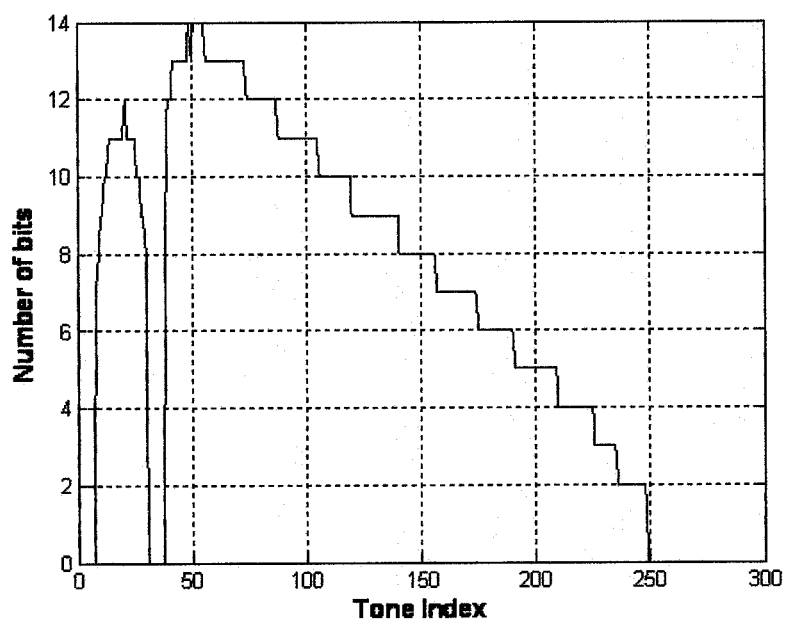
FIG. 5A illustrates a normal bit distribution for a DSL line.
Figure 5B:
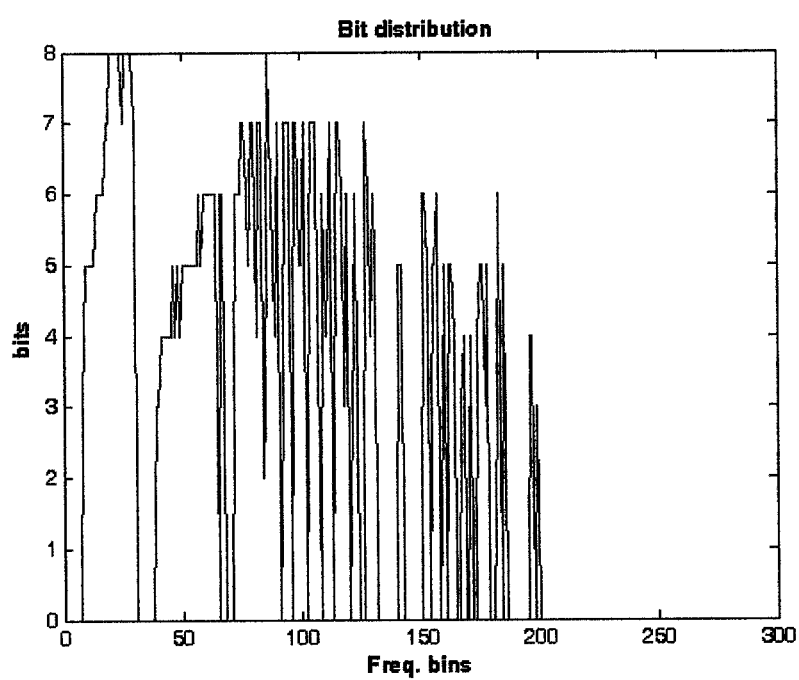
FIG. 5B illustrates a substantially varying bit distribution for a DSL line.

An example of a normal bit distribution is shown in FIG. 5a, and a line with significant varying bit distribution is shown in FIG. 5b. In contrast to FIG. 4, the distribution has large variations across even adjacent frequencies. The following observations are made with respect to the differences between the two cases. In case of a normal bit distribution, the number of bits does not abruptly vary over the frequency tones. In FIG. 5a, the difference between two adjacent tones is typically 0 and at most 1 with the exception of the tones with 0 bit. Some tones are not allowed to be used, and therefore the number of bits can abruptly be increased or decreased when an adjacent tone has such a limitation.

On the other hand, the bit distribution of a DSL line with a wiring defect may have abrupt changes in the number of bits as shown in the example FIG. 5b. In contrast to the normal bit distribution, the sum of the absolute values of the changes is typically extremely large. Therefore, it is possible to differentiate the two cases by quantifying the variations across frequency bins (tones), and comparing against predetermined thresholds.

Figure 6A:
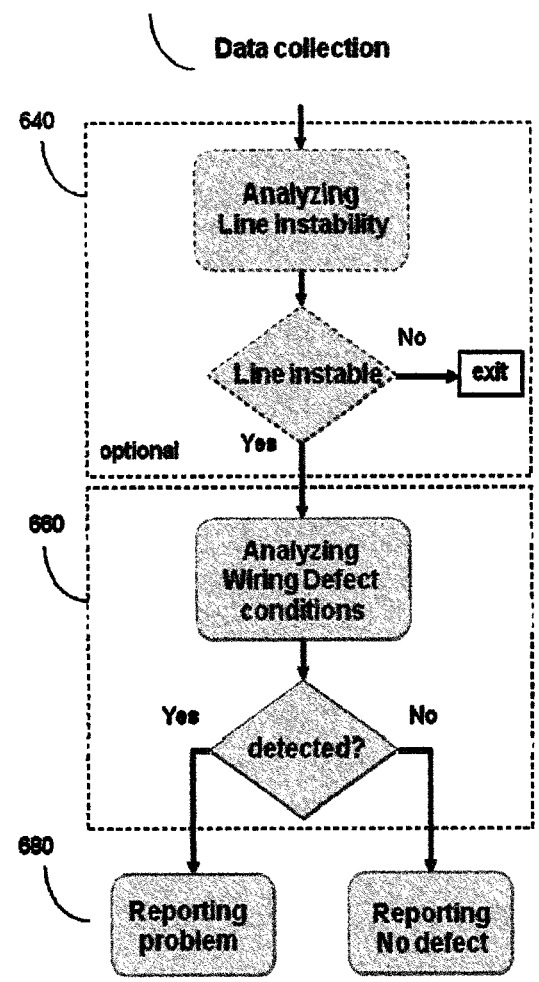
FIG. 6A provides a flow diagram of an embodiment.

FIG. 6A, describes the process of analyzing and detecting rapid line parameter variations, such as the example above, in relationship to FIG. 3. The first step is collecting data (620) which is performed by collector means (320). The next step, which is an optional step, is to analyze line instability (640). This step is further discussed later. If the line is determined to be unstable, then the next step is to analyze and determine whether this instability is due to a wiring defect (660). However, it is not necessary to perform line instability analysis, and the system can perform wiring defect analysis on collected data without doing line instability analysis. These steps are controlled by the controller 310, and by the operator of the system. The wiring defect analysis (660) is performed by the wiring defect analyzing means (340). The wiring defect analysis process is further described herein. If a wiring defect is detected, then it is reported (680) that a wiring defect might exist, and if a wiring defect is not detected, then it is reported that there is no wiring defect. The reporting is performed by the "Report generating" means (350).

As described above, after collecting data, the first step is the optional step of analyzing line instability. For this purpose, channel performance monitoring parameters and/or line performance monitoring parameters are obtained as described above with reference to FIG. 3. These parameters could include:

CV, code violations
FEC, number of corrected codewords
FECS, FEC seconds
ES, errored seconds
SES, severely errored seconds
LOSS, loss-of-signal seconds
UAS, unavailable seconds
Retrains
Retrain count
Resynchronization
Resynchronization count In some embodiments, distributions of these quantities over time are evaluated. Higher-layer parameters may also be obtained for applications such as Internet Protocol Television (IPTV) or other video stream delivery.

Line instability can be determined from evaluation of such distributions. For example if the distribution for CV does not satisfy the following conditions, then the line is declared unstable.
CV<=1 for 95% of the intervals,
CV<=10 for 99% of the intervals,
CV<=100 for 100% of the intervals, Expressions can be constructed using combinations of rules with multiple parameters. These may include summations or more elaborate expressions (e.g. SES+UAS, CV/(360e3−(SES+UAS)*400)). Such expressions can be constructed using parameters from CO-side or CP-side, or both. These expressions could depend on the vendor and/or system ID.

Any conditions derived from parameters such as the above may also incorporate performance parameters such as data rate, maximum attainable bit rate (MABR) and margin.

For example if MABR is used as the performance parameter for a specific line, collected MABR data for that line is compared to a neighborhood average for the given loop length. If the MABR data rates are lower than the average by a predetermined margin, then the line is considered likely of being unstable. The average neighborhood MABR is obtained by the following steps: collecting MABR data in the neighborhood network of a line, taking the average or other statistical function of the MABR for lines which have similar loop lengths. This data can also be updated over time. The network neighborhood average shows the expected MABR for all the lines in a specific neighborhood, and if a line MABR drops below that average, it could be an indication of a line problem. Examples of the other statistical functions, besides the mean, could include "median" or "X percentage worst case value". "X percentage worst case value" would be the MABR for which X percentage of the lines have lower MABR.

Information characterizing the problem or failure may be recorded. For example, the time/day of line problems can be recorded to provide statistical information about the times and days when such events are most likely to happen. This can be achieved for example by recording the intervals when CV or some other channel/line performance monitoring parameter exceeds a certain threshold. A failure may also be recorded, for example, if the parameter falls below the threshold.

Figure 6B:
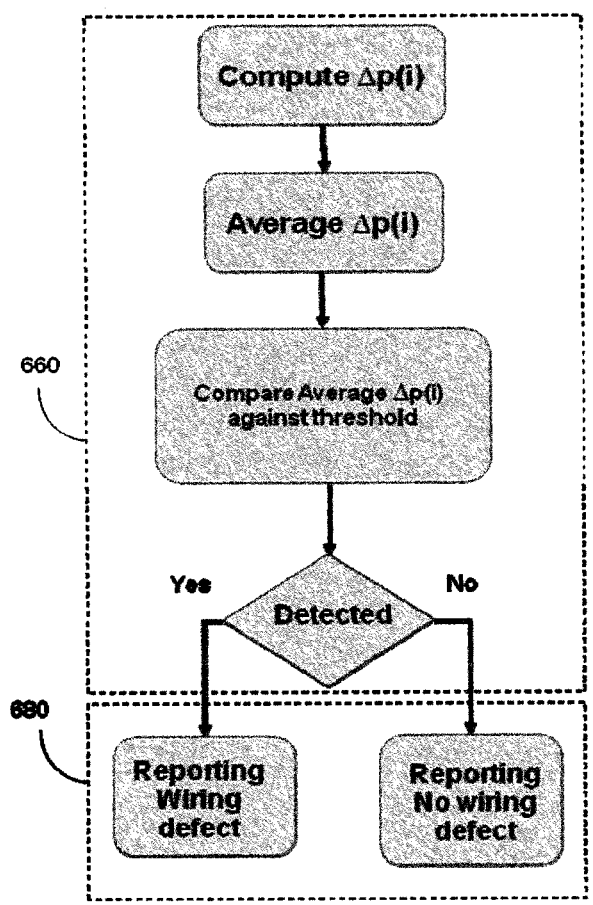
FIG. 6B provides a flow diagram of an embodiment of a method of performing wiring defect analysis.

With reference to FIG. 6, the next step after performing the optional line instability analysis is to perform Wiring defect analysis. FIG. 6b shows an embodiment of the Wiring defect analysis. A metric is introduced to quantify-line parameter variations. Examples of such line parameters are bit distribution, Hlog (Hlin), SNR, and measured noise. The metric is compared against a threshold. If the metric exceeds the specified threshold the line parameter is considered to have rapid variations that could be a result of a wiring defect. Alternatively, the metric may fall below the specified threshold. Thus, generally speaking, when a metric passes the threshold, whether exceeding or falling below the threshold, the line parameter may be considered to have rapid variations. In this embodiment the metric is average line parameter (p) change.

1) First the line parameter change across each tone is computed:

$$\Delta p(i) = |p(i) - p(i-1)|$$

where "i" is the frequency tone index. The tones could be either the upstream tones, downstream tones, or both. The calculation can also be done over a section of the band, or the whole band. For example in ADLS1, tones 60 or higher may be selected.

2) Then the average of all changes across total of number of tones is calculated:

$$\text{Average } \Delta p(i)$$

The frequency tone index "i" are the same as the ones in step 1.

3) Finally the average change is compared against a threshold. An example would be the following condition:

Average $\Delta p(i)$ > threshold        Condition:

4) If the above condition is true, then the line is considered to have rapid varying line parameter variations. Depending on how much the Average $\Delta p(i)$ is greater than the threshold, the condition would also represent the "severity" of the problem. The "severity" indicates the amount the metric exceeds the threshold (or in some embodiments is below the threshold), which could in turn indicate the severity of the underlying problem. The reporting function, depending on this output, could report the presence of a wiring defect, or absence of a wiring defect if the condition is not true, as well as the "severity" of the problem.

According to other embodiments, other metrics are also introduced to measure the line parameter variations. Each metric could be compared against a threshold. If the metric exceeds (or in some embodiments is below) the specified threshold the line is considered to have rapid line parameter variations.

The above metric as well as the other metrics devised are described below:

$$\text{avgP\_Change} = \left| \frac{\sum_{i=33}^{255}(p_i - p_{i-1})}{n} \right|,$$

where $p_i$ is number of bits in tone i, n is the total number of selected tones.

This metric was used in the FIG. 6b example. It is normally small for typical line parameter distributions. However, it has a large value when applied to a line which has rapid line parameter variations over a small bandwidth.

The tones could be either the upstream tones, downstream tones, or both. The calculation can also be done over a section of the band, or the whole band. For example the index may be 33 to 255 for ADSL, but it may be higher for ADSL2+, VDSL1, VDSL2. The tones could also be selected based on certain conditions such as tones for which $p_i \neq 0$ or $p_{i-1} \neq 0$.

$$\text{totalP\_Change} = \left| \sum_{i=33}^{255}(p_i - p_{i-1}) \right|$$

This metric is also normally small for typical line parameter distributions. However, the metric will have a large value for the cases that exhibit large magnitude of line parameter variations across the line bandwidth. The tones are selected similarly to the previous case.

numToneChange: Number of tones which experienced at least a small $\Delta p$ (i.e. such as 2 bits when line parameter is a bit distribution) absolute change compared to previous tone.

This metric captures the cases where there are a large number of variations across a large bandwidth, however the variations are a small fixed amount (i.e. small $\Delta p$) per change. The tones are selected similar to the previous two cases.

avgNoiseChange: similar to avgP_Change, but use estimated noise spectrum to find average noise change in dB.

The noise change calculation above is done similar to the cases above, except that for each tone, measured noise samples are used.

As explained in the section on normal bit distribution, there are two ways to obtain the noise information. One way is to use reported parameters, Quiet-Line-Noise (QLN) or Mean Square Error (MSE) per tone. The other way is to calculate the noise indirectly from SNR, HLOG and PSD. This is done through the following calculation:

MSE(n)=PSD(n)+Hlog(n)−SNR(n), where n is the frequency tone index.

The tones over which the noise samples are used are selected similarly to the other cases above.

totalNoisechange: similar to totalP_Change, but uses estimated noise spectrum.

The noise change calculation above is done similar to the cases above, except that for each tone, measured or estimated noise samples are used. The tones over which the noise samples are used are selected similar to the other cases above.

Moreover, in all of the above metrics, weighting factors may be applied to different values at certain frequencies. The weighting is used because samples from certain frequencies might be less reliable than other frequencies.

The following example shows the weighting applied to totalP_Changes metric.

$$m1 = \left| \sum_{i=33}^{140} |p_i - p_{i-1}| \right| \text{ for } i = 33 - 140$$

$$m2 = \left| \sum_{i=141}^{256} |p_i - p_{i-1}| \right| \text{ for } i = 141 - 256$$

m_total=(m1*w1+m2*w2)/(w1+w2)

where weight w1 is applied to frequency tone indices 33-140 (These are the lower half of the ADSL downstream band), and weight w2 is applied to frequency tone indices 141-256 (which are the upper half of the ADSL downstream band). The combined weighted metric m_total is calculated as the weighted average of the weighted metrics m1 and m2.

Also, in other embodiments the above metrics can be applied to other DSL line parameters (such as bit distribution, Hlog (Hlin), SNR and measured noise). Hlog (Hlin) and SNR per tone samples are already reported parameters similar to the bit distribution, which then could be used in the analysis.

Noise information is obtained as discussed in the previous sections. The metric weighting discussed above specially applies to metrics constructed from these reported or measured samples, as the reported or measured information normally has varying reliability over different frequencies.

In one embodiment, the calculated detection metrics are compared against a pre-chosen threshold. If any of the metrics are above (or in some embodiments below) their corresponding threshold, the line is considered to have a wiring defect. In another embodiment, a combination of the values of the above metrics are compared against a single threshold.

Figure 7A:
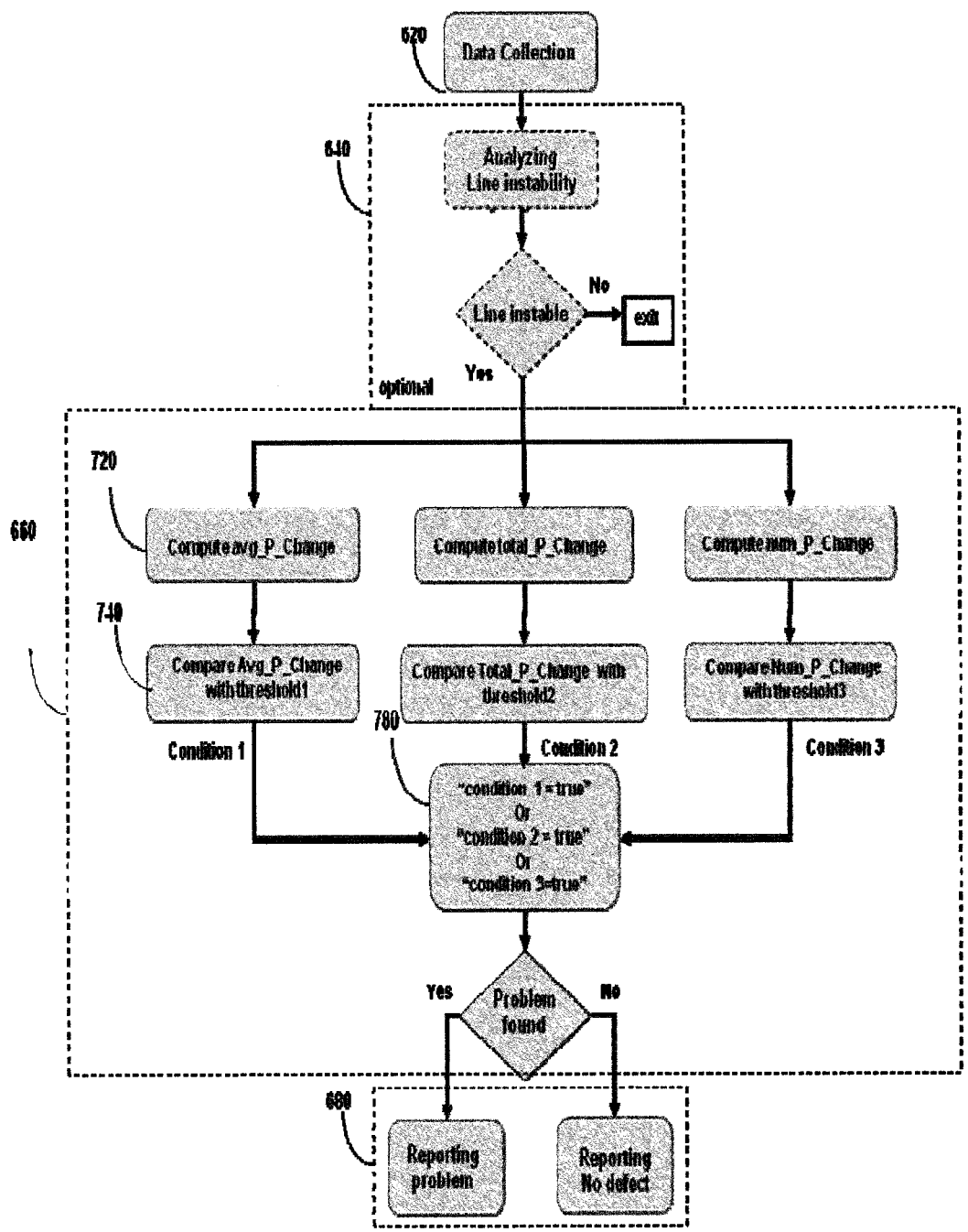
FIG. 7A illustrates one embodiment of a DSL analysis system.

FIG. 7a shows an example of one embodiment, in reference to FIG. 6, where three metrics are used to analyze line parameter variations for a line. The first step as in FIG. 6A is collecting data (620). The next step, which is an optional step, is to analyze line instability (640). The next step is Wiring defect analysis (660). In this example three different metric are calculated: avgP_Change, totalP_Change and numP_Change, which were each described above. Following metric computations, each metric is compared against its corresponding threshold, depicted by forming the conditions 1, 2, and 3 (720). These conditions are then combined to form the final decision (780). In this example a logical combining of the conditions is executed by using the logical "Or" function. This means that if any of the conditions 1, 2 or 3 are met, then the line is considered to have a rapid varying line parameter as a result of a possible wiring defect. The result is then reported by the reporting means 680.

Figure 7B:
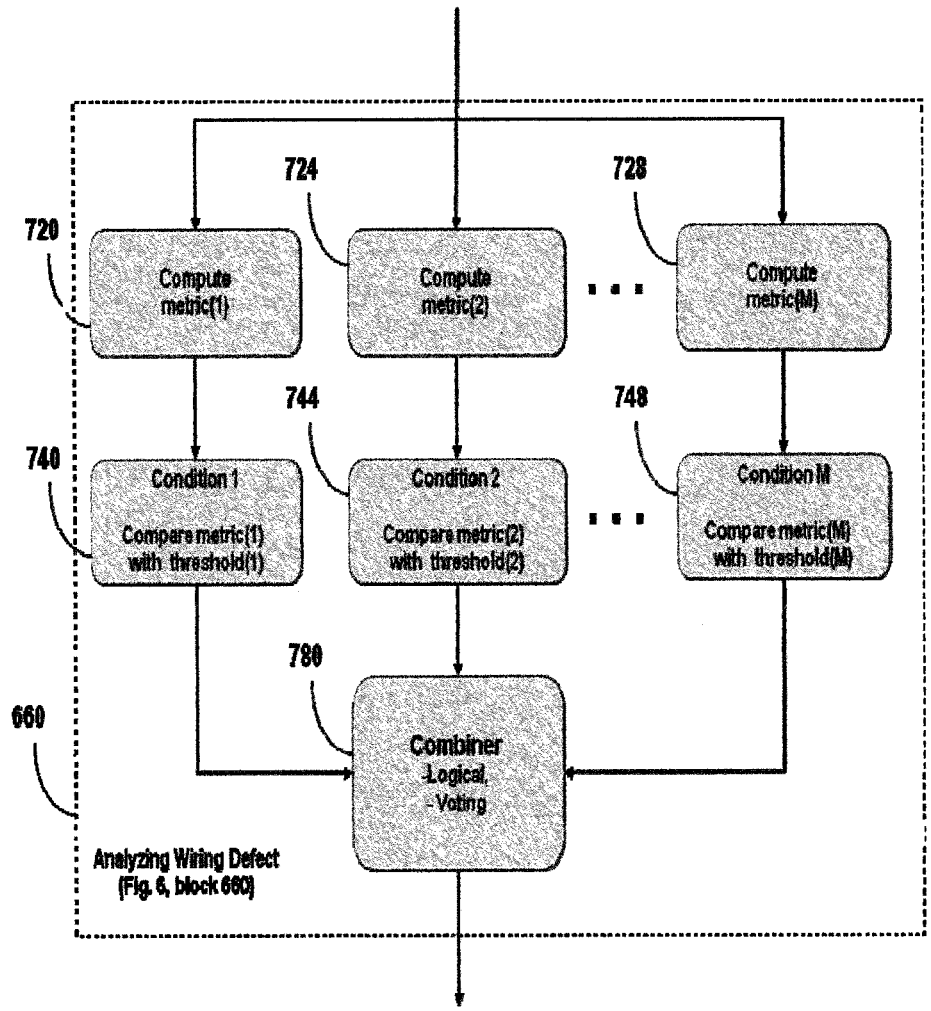
FIG. 7B provides a flow diagram of one embodiment of a DSL analysis system as it pertains to performing wiring defect analysis.

FIG. 7b, shows the more general case of the wiring defect analysis process. As above one or more metrics are computed (720, 724 through 728). The metrics are used to form conditions 1, 2, through M. (740, 744, 748). These conditions form Boolean results "true" or "false". Each metric is compared against its corresponding threshold, to form its corresponding condition. The results of each comparison then can be used in combination with other comparison results to make a decision. The combiner 780 may use different functions and rules to combine the results of the comparisons.

The combination of the different criteria could include logical function such as "OR" and "AND" functions.

An example would be:
If "condition(1)=true" AND "condition(2)=true"
Then declare "Wiring defect"

Also the combination function could incorporate a voting method (e.g. to declare detection if N out of M rules are satisfied).

An example would be:
If any two out of three conditions are "true"
Then declare "Wiring defect"

The final decision made by the combiner is then provided to the report generating means 680 as depicted in FIG. 6A.

Figure 7C:
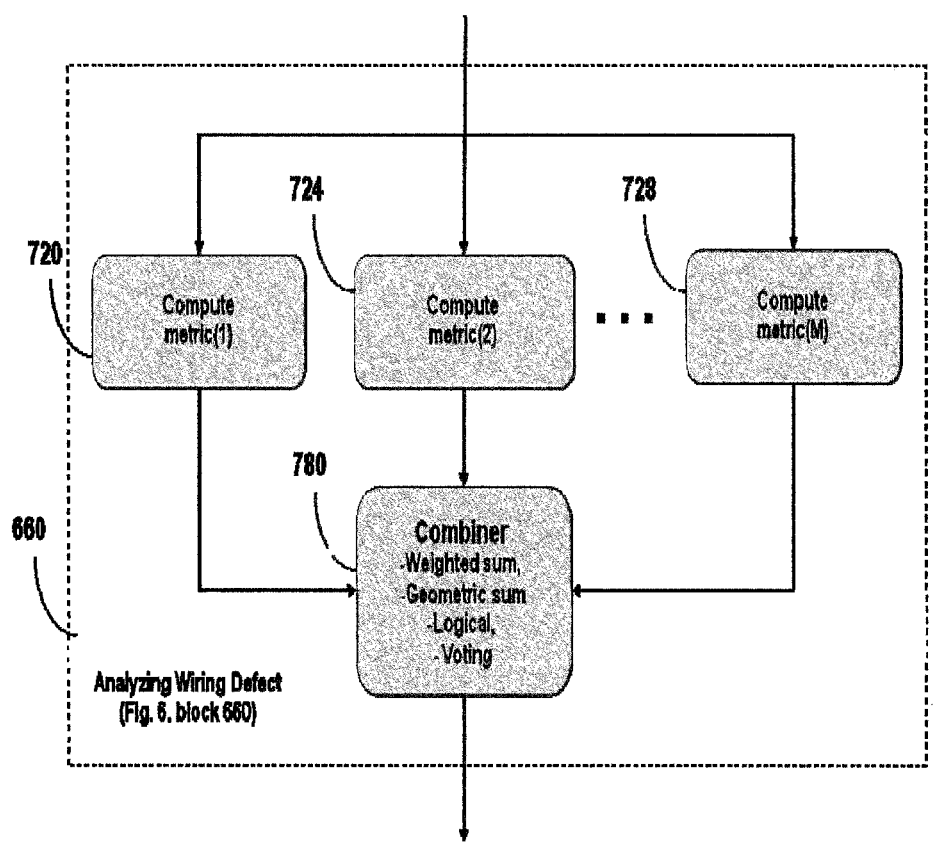
FIG. 7C provides a flow diagram of one embodiment of a DSL analysis system as it pertains to performing wiring defect analysis.

FIG. 7c shows another embodiment of a general case for the Wiring defect analysis process. Similar to the previous case, the metrics are computed first (720, 724 through 728). However, comparisons are done inside the combiner (780). The combiner 780 combines the metrics and compares them against a threshold. In addition to the logical and voting comparison methods mentioned in reference to FIG. 7a, a weighted combining function may be applied to combine the metrics.

The weighting function could be chosen to be a weighted sum or a geometric sum. The following example shows the weighted sum combination of the "totalP_Change" metric and the "numToneChange" metric, where w1 and w2 are corresponding combining weights, and threshold is the overall combined threshold:

$$(w1*totalP\_Change + w2*numToneChange)/(w1+w2) > threshold$$

The above weights can be a function of "severity", which means if one of the metrics has a larger "severity", then it is weighted more than a metric which has a smaller severity. The weights can also represent the "reliability" of a metric. If, for example, a metric is more reliable (e.g. the condition associated with it happens more often), that metric can be given a higher weighting.

In general the weighted sum combination can be written as:

$$\sum_i (w(i) \times \text{metric}(i)),$$

where (i) represents the i(th) metric

And the weighted geometric sum combination can be written as:

$$\prod_i \text{metric}(i)^{w(i)},$$

where (i) represents the i(th) metric

Moreover, similar to the metrics combining, the "severity" function itself can also be combined and reported. As noted before, the difference between a metric and its corresponding threshold represents the "severity" for that metric. So for each metric, a corresponding severity result can be computed. Similarly, the "severity" results of all the metrics could be combined (this could be a weighted combination) and overall combined severity result can be reported. The following example shows the weighted sum combination of severity for the "totalP_Change" metric and the severity for the "numToneChange" metric, where w1 and w2 are corresponding combining weights, and threshold is the overall combined threshold:

$$s\_total = (w1*s1 + w2*s2)/(w1+w2)$$

where:
s_total is the weighted combined severity
s1=totalP_Change−threshold1
s2=numToneChange−threshold2
further wherein threshold1, 2 are corresponding thresholds for totalP_Change and numToneChange.

The final decision and results made by the combiner are then provided to the report generating means 680 as depicted in FIG. 6.

FIG. 8 illustrates a typical computer system that can be used by a user and/or controller in accordance with one or more embodiments. The computer system 800 includes any number of processors 802 (also referred to as central processing units, or CPUs) that are coupled to storage devices including primary storage 806 (typically a random access memory, or RAM), primary storage 804 (typically a read only memory, or ROM). As is well known in the art, primary storage 804 acts to transfer data and instructions uni-directionally to the CPU and primary storage 806 is used typically to transfer data and instructions in a bi-directional manner. Both of these primary storage devices may include any suitable of the computer-readable media described above. A mass storage device 808 also is coupled bi-directionally to CPU 802 and provides additional data storage capacity and may include any of the computer-readable media described above. The mass storage device 808 may be used to store programs, data and the like and is typically a secondary storage medium such as a hard disk that is slower than primary storage. It will be appreciated that the information retained within the mass storage device 808, may, in appropriate cases, be incorporated in standard fashion as part of primary storage 806 as virtual memory. A specific mass storage device such as a CD-ROM may also pass data uni-directionally to the CPU.

CPU 802 also is coupled to an interface 810 that includes one or more input/output devices such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 802 optionally may be coupled to a computer or telecommunications network using a network connection as shown generally at 812. With such a network connection, it is contemplated that the CPU might receive information from the network, or might output information to the network in the course of performing the above-described method steps. The above-described devices and materials will be familiar to those of skill in the computer hardware and software arts. The hardware elements described above may define multiple software modules for performing the operations disclosed. For example, instructions for running a codeword composition controller may be stored on mass storage device 808 or CD-ROM and executed on CPU 802 in conjunction with primary memory 806. In a preferred embodiment, the codeword controller is divided into software sub-modules.

The many features and advantages of the disclosed embodiments are apparent from the written description, and thus, the appended claims are intended to cover all such features and advantages. Further, the invention is not limited to the exact construction and operation as illustrated and described. Therefore, the described embodiments should be taken as illustrative and not restrictive, and the invention should not be limited to the details given herein but should be defined by the following claims and their full scope of equivalents, whether foreseeable or unforeseeable now or in the future.

What is claimed is:

1. A digital subscriber line (DSL) wiring defect analyzer, comprising:
    a data collection module coupled to a plurality of sources of information in or connected to a DSL system from which to collect data said collected data including data indicating a rapid and abrupt variation in bit distributions across frequency tones in a DSL signal transmitted on a DSL line;
    a wiring defect analyzer module coupled to the data collection module to analyze the collected data including:
        generating a sum of the variation in bit distributions across frequency tones in the DSL signal transmitted on the DSL line;
        generating an average of the variation in bit distributions across frequency tones in the DSL signal transmitted on the DSL line; and
        generating a sum of the number of frequency tones in the DSL signal transmitted on the DSL line that experience a minimum variation in bit distribution compared to an adjacent frequency tone;
    comparing the sum of the variation in bit distributions across frequency tones in the DSL signal transmitted on the DSL line, the average of the variation in bit distributions across frequency tones in the DSL signal transmitted on the DSL line, and the sum of the number of frequency tones in the DSL signal transmitted on the DSL line that experience a minimum variation in bit distribution compared to an adjacent frequency tone against a corresponding threshold value to determine whether a wiring defect exists in the DSL system; and
    a report generator module coupled to the wiring defect analyzer module to receive a parameter value generated by the wiring defect analyzer module indicating a wiring defect exists when the wiring defect analyzer module detects one or more of the sum of the variation in bit distributions across frequency tones in the DSL signal transmitted on the DSL line, the average of the variation in bit distributions across frequency tones in the DSL signal transmitted on the DSL line, and the sum of the number of frequency tones in the DSL signal transmitted on the DSL line that experience a minimum variation in bit distribution compared to an adjacent frequency tone differs from the corresponding threshold value and provide the parameter value to a DSL system operator.

2. The DSL wiring defect analyzer of claim 1, wherein the plurality of sources of information in or connected to a DSL system includes a network management station, a managed entity in an access node, or a management information base (MIB), a broadband network, a database storing binder-level information such as deployment information, topology information, crosstalk coupling, or modem capability information such as procedures for bit loading and power allocation, service priorities, operational data, and parameter history data.

3. The DSL wiring defect analyzer of claim 1, wherein the DSL wiring defect analyzer module further to analyze the collected data to determine whether line instability exists, and further wherein the DSL wiring defect analyzer module to analyze the collected data analyzes whether any existing line instability is due to an existing wiring defect.

4. The DSL wiring defect analyzer of claim 3, wherein the DSL wiring defect analyzer module is to obtain and evaluate channel performance monitoring parameters or line performance monitoring parameters, or distributions of the parameters over time, to analyze whether any line instability exists.

5. The DSL wiring defect analyzer of claim 1, wherein the wiring defect analyzer module further comprises a combiner module that combines the sum of the variation in bit distributions across frequency tones in the DSL signal transmitted on the DSL line, the average of the variation in bit distributions across frequency tones in the DSL signal transmitted on the DSL line, and the sum of the number of frequency tones in the DSL signal transmitted on the DSL line that experience a minimum variation in bit distribution compared to an adjacent frequency tone and compares them against a threshold according to one of a logical combination, a voting method, a weighted sum, or a geometric sum.

6. A computer-implemented method for a controller to detect a defect in wiring in a Digital Subscriber Line (DSL) system, comprising:
    collecting data including instantaneous values, a history of values, and parameters relating to a central office or customer premises equipment, at a data collection module in the controller, said collected data including data indicating a rapid and abrupt variation in bit distributions across frequency tones in a DSL signal transmitted on a DSL line;
    analyzing, at a wiring defect analyzer module in the controller, the DSL line for a wiring defect based on the collected data including:

generating a sum of the variation in bit distributions across frequency tones in the DSL signal transmitted on the DSL line;

generating an average of the variation in bit distributions across frequency tones in the DSL signal transmitted on the DSL line; and generating a sum of the number of frequency tones in the DSL signal transmitted on the DSL line that experience a minimum variation in bit distribution compared to an adjacent frequency tone;

comparing the sum of the variation in bit distributions across frequency tones in the DSL signal transmitted on the DSL line, the average of the variation in bit distributions across frequency tones in the DSL signal transmitted on the DSL line, and the sum of the number of frequency tones in the DSL signal transmitted on the DSL line that experience a minimum variation in bit distribution compared to an adjacent frequency tone against a corresponding threshold value; and reporting via a reporter module in the controller a wiring defect was detected responsive to the analyzing step when the analyzing step detects one or more of the sum of the variation in bit distributions across frequency tones in the DSL signal transmitted on the DSL line, the average of the variation in bit distributions across frequency tones in the DSL signal transmitted on the DSL line, and the sum of the number of frequency tones in the DSL signal transmitted on the DSL line that experience a minimum variation in bit distribution compared to an adjacent frequency tone differs from the corresponding threshold value.

7. The method of claim 6, wherein the parameters relating to a central office or customer premises equipment include line inventory parameters, channel test, diagnostic and status parameters, line test, diagnostic and status parameters, line performance monitoring parameters, and line failures.

8. The method of claim 6, further comprising analyzing the data so collected by computing at the wiring defect analyzer in the controller an additional metric based on the collected data and evaluating the additional metric against a condition.

9. The method of claim 8 wherein the additional metric is a one of a measure of Hlog, a measure of Hlin, a measure of SNR, and a measured noise.

10. The method of claim 8 wherein the analyzing the data comprises analyzing channel performance monitoring parameters and line performance monitoring parameters, or evaluating distributions of these parameters over time, including:
CV, code violations;
FEC, number of corrected codewords;
FECS, FEC seconds;
ES, errored seconds;
SES, severely errored seconds;
LOSS, loss-of-signal seconds;
UAS, unavailable seconds;
retrains;
retrain count;
resynchronization; and
resynchronization count.

* * * * *